(12) United States Patent
Tabe et al.

(10) Patent No.: US 11,285,550 B2
(45) Date of Patent: Mar. 29, 2022

(54) CUTTING INSERT

(71) Applicant: TUNGALOY CORPORATION, Fukushima (JP)

(72) Inventors: Tomoha Tabe, Iwaki (JP); Ryuichi Saji, Iwaki (JP)

(73) Assignee: TUNGALOY CORPORATION, Iwaki (JP)

( * ) Notice: Subject to any disclaimer, the term of this patent is extended or adjusted under 35 U.S.C. 154(b) by 116 days.

(21) Appl. No.: 16/805,421

(22) Filed: Feb. 28, 2020

(65) Prior Publication Data

US 2020/0276657 A1    Sep. 3, 2020

(30) Foreign Application Priority Data

Mar. 1, 2019   (JP) .............................. JP2019-037336
Nov. 28, 2019  (JP) .............................. JP2019-215427

(51) Int. Cl.
*B23C 5/20*     (2006.01)
*B23C 5/06*     (2006.01)
(Continued)

(52) U.S. Cl.
CPC .............. *B23C 5/207* (2013.01); *B23C 5/109* (2013.01); *B23C 5/2221* (2013.01); *B23C 5/06* (2013.01);
(Continued)

(58) Field of Classification Search
CPC ...... B23C 2200/0483; B23C 2200/083; B23C 2200/123; B23C 2200/203;
(Continued)

(56) References Cited

U.S. PATENT DOCUMENTS 3,636,602 A * 1/1972 Owen ..................... B23C 5/207
                                                    407/113
4,068,976 A * 1/1978 Friedline ................. B23C 5/207
                                                    407/114
(Continued)

FOREIGN PATENT DOCUMENTS

JP         07276130 A  * 10/1995   ............. B23C 5/202
JP       2011104738 A     6/2011
(Continued)

*Primary Examiner* — Sara Addisu
(74) *Attorney, Agent, or Firm* — Studebaker & Brackett PC

(57) ABSTRACT

A cutting insert has a cutting edge formed on part of an intersecting ridge line portion of an upper face or a lower face and a side face. The cutting edge includes a major cutting edge, a minor cutting edge, and a connecting cutting edge that connects the major cutting edge and the minor cutting edge. A minor cutting edge flank that is part of the side face and that corresponds to the minor cutting edge includes a first minor cutting edge flank that connects to the minor cutting edge and that has a clearance angle of 0°, and a second minor cutting edge flank that connects to the first minor cutting edge flank and that has a clearance angle of a negative value. A connecting cutting edge flank that is part of the side face and that corresponds to the connecting cutting edge includes a first connecting cutting edge flank that connects to the connecting cutting edge and that has a clearance angle of 0° or greater, and a second connecting cutting edge flank that connects to the first connecting cutting edge flank and has a clearance angle that is greater than the clearance angle of the first connecting cutting edge flank.

11 Claims, 10 Drawing Sheets

(51) Int. Cl.
*B23C 5/10* (2006.01)
*B23C 5/22* (2006.01)

(52) U.S. Cl.
CPC ............... *B23C 2200/0483* (2013.01); *B23C 2200/083* (2013.01); *B23C 2200/123* (2013.01); *B23C 2200/206* (2013.01); *B23C 2200/243* (2013.01)

(58) Field of Classification Search
CPC ........ B23C 2200/208; B23C 2200/125; B23C 2200/243; B23C 5/109; B23C 5/2221; B23C 2200/04; B23C 2200/0477; B23C 5/207; B23C 5/202; B23C 5/2213; B23B 2200/3681
See application file for complete search history.

(56) References Cited

U.S. PATENT DOCUMENTS

| | | | | |
|---|---|---|---|---|
| 4,194,862 A * | 3/1980 | Zweekly | ............ | B23B 51/0493 408/224 |
| 4,248,555 A * | 2/1981 | Satou | ............ | B23B 51/048 408/186 |
| 4,648,760 A * | 3/1987 | Karlsson | ............ | B23B 27/141 407/113 |
| 4,681,486 A * | 7/1987 | Hale | ............ | B23B 27/141 407/114 |
| 4,867,616 A * | 9/1989 | Jakubowicz | ............ | B23C 5/08 407/58 |
| 5,052,863 A * | 10/1991 | Satran | ............ | B23B 51/048 407/113 |
| 5,085,542 A * | 2/1992 | Nakayama | ............ | B23B 27/141 407/114 |
| 5,145,295 A * | 9/1992 | Satran | ............ | B23C 5/2213 407/113 |
| 5,221,164 A * | 6/1993 | Allaire | ............ | B23C 5/207 407/113 |
| 5,382,118 A * | 1/1995 | Satran | ............ | B23C 5/2221 407/42 |
| 5,421,679 A * | 6/1995 | Pantzar | ............ | B23C 5/202 407/113 |
| 5,443,334 A * | 8/1995 | Pantzar | ............ | B23C 5/207 407/113 |
| 5,549,424 A * | 8/1996 | Bernadic | ............ | B23B 27/065 407/100 |
| 5,593,255 A * | 1/1997 | Satran | ............ | B23C 5/109 407/113 |
| 5,779,401 A * | 7/1998 | Stallwitz | ............ | B23B 27/045 407/11 |
| 5,791,832 A * | 8/1998 | Yamayose | ............ | B23C 5/109 407/113 |
| 5,810,521 A * | 9/1998 | Pantzar | ............ | B23B 27/145 407/114 |
| 5,947,650 A * | 9/1999 | Satran | ............ | B23C 5/2234 407/113 |
| 6,053,671 A * | 4/2000 | Stedt | ............ | B23C 5/2221 407/35 |
| 6,135,681 A * | 10/2000 | Nuzzi | ............ | B23B 51/0009 407/116 |
| 6,142,716 A * | 11/2000 | Jordberg | ............ | B23C 5/202 407/114 |
| 6,196,770 B1 * | 3/2001 | Astrom | ............ | B23C 5/109 407/40 |
| 6,238,146 B1 * | 5/2001 | Satran | ............ | B23C 5/08 407/113 |
| 6,503,028 B1 * | 1/2003 | Wallstrom | ............ | B23C 5/2221 407/35 |
| 6,543,970 B1 * | 4/2003 | Qvarth | ............ | B23C 5/202 407/114 |
| 6,632,051 B1 * | 10/2003 | Wermeister | ............ | B23B 27/065 407/114 |
| 6,722,824 B2 * | 4/2004 | Satran | ............ | B23C 5/2221 407/113 |
| 6,929,427 B2 * | 8/2005 | Satran | ............ | B23C 5/109 407/42 |
| 7,008,145 B2 * | 3/2006 | Astrakhan | ............ | B23C 5/006 407/35 |
| 7,040,844 B1 * | 5/2006 | Daiguji | ............ | B23C 5/109 407/113 |
| 7,549,824 B2 * | 6/2009 | Agic | ............ | B23B 27/16 407/42 |
| 7,591,614 B2 * | 9/2009 | Craig | ............ | B23C 5/109 407/113 |
| 7,972,091 B2 * | 7/2011 | Svenningsson | ............ | B23C 5/109 407/113 |
| 8,025,465 B2 * | 9/2011 | Ishida | ............ | B23C 5/06 407/114 |
| 8,029,213 B2 * | 10/2011 | Tanaka | ............ | B23C 5/207 407/114 |
| 8,157,489 B2 * | 4/2012 | Wolf | ............ | B23B 27/141 408/223 |
| 8,337,123 B2 * | 12/2012 | Ishida | ............ | B23C 5/202 407/42 |
| 8,371,774 B2 * | 2/2013 | Zastrozynski | ............ | B23B 27/141 407/113 |
| 8,740,509 B2 * | 6/2014 | Luik | ............ | B23C 5/207 407/42 |
| 8,882,407 B2 * | 11/2014 | Agic | ............ | B23C 5/109 407/113 |
| 8,931,979 B2 * | 1/2015 | Choi | ............ | B23C 5/207 407/113 |
| 9,079,251 B2 * | 7/2015 | Dufour | ............ | B23B 27/145 |
| 9,132,485 B2 * | 9/2015 | Ortlund | ............ | B22F 5/10 |
| 10,150,170 B2 * | 12/2018 | Nam | ............ | B23C 5/06 |
| 2004/0037659 A1 * | 2/2004 | Sung | ............ | B23C 5/202 407/114 |
| 2004/0240949 A1 * | 12/2004 | Pachao-Morbitzer | ............ | B23B 27/10 407/11 |
| 2005/0084342 A1 * | 4/2005 | Festeau | ............ | B23C 5/06 407/113 |
| 2006/0275088 A1 * | 12/2006 | Lehto | ............ | B23C 5/2221 407/40 |
| 2007/0031201 A1 * | 2/2007 | Maeda | ............ | B23C 5/109 407/34 |
| 2007/0189863 A1 * | 8/2007 | Viol | ............ | B23B 27/04 407/113 |
| 2008/0260476 A1 * | 10/2008 | Ishida | ............ | B23C 5/06 407/114 |
| 2008/0304924 A1 * | 12/2008 | Engstrom | ............ | B23C 5/202 407/114 |
| 2009/0188356 A1 * | 7/2009 | Ishida | ............ | B23C 5/06 83/53 |
| 2010/0003090 A1 * | 1/2010 | Johansson | ............ | B23C 5/202 407/113 |
| 2010/0092253 A1 * | 4/2010 | Ishida | ............ | B23C 5/06 407/42 |
| 2010/0215446 A1 * | 8/2010 | Wandeback | ............ | B23C 5/202 407/51 |
| 2010/0247252 A1 * | 9/2010 | Hatta | ............ | B23C 5/207 407/42 |
| 2010/0266353 A1 | 10/2010 | Zitzlaff et al. | | |
| 2011/0027027 A1 * | 2/2011 | Hatta | ............ | B23C 5/202 408/1 R |
| 2011/0070038 A1 * | 3/2011 | Ishida | ............ | B23C 5/06 407/42 |
| 2011/0081210 A1 * | 4/2011 | Ishida | ............ | B23C 5/207 407/42 |
| 2011/0318119 A1 * | 12/2011 | Ejderklint | ............ | B23C 5/202 407/51 |
| 2012/0294686 A1 * | 11/2012 | Ishida | ............ | B23C 5/202 409/132 |
| 2013/0108387 A1 * | 5/2013 | Ishi | ............ | B23C 5/109 409/132 |
| 2014/0010605 A1 * | 1/2014 | Smilovici | ............ | B23C 5/06 407/42 |
| 2014/0334890 A1 * | 11/2014 | Takahashi | ............ | B23C 5/2213 407/114 |

(56) References Cited

U.S. PATENT DOCUMENTS

| | | | |
|---|---|---|---|
| 2015/0196963 A1* | 7/2015 | Bhagath | B23C 5/2213 407/42 |
| 2015/0306687 A1* | 10/2015 | Choi | B23C 5/2213 407/33 |
| 2016/0082528 A1* | 3/2016 | Ballas | B23C 5/06 407/48 |
| 2017/0014919 A1* | 1/2017 | Kister | B23C 5/202 |
| 2017/0197259 A1* | 7/2017 | Kumoi | B23C 5/207 |
| 2017/0216940 A1* | 8/2017 | Aso | B23C 5/109 |
| 2017/0282262 A1* | 10/2017 | Burtscher | B23C 5/06 |
| 2018/0015554 A1* | 1/2018 | Roman | B23C 5/207 |
| 2019/0054550 A1 | 2/2019 | Yoshida et al. | |
| 2019/0160563 A1* | 5/2019 | Ballas | B23C 5/06 |
| 2019/0366452 A1* | 12/2019 | Eriksson | B23C 5/06 |
| 2020/0023444 A1* | 1/2020 | Saitoh | B23C 5/207 |
| 2021/0023634 A1* | 1/2021 | Eriksson | B23C 5/12 |
| 2021/0138565 A1* | 5/2021 | Andersson | B23C 5/207 |
| 2021/0252615 A1* | 8/2021 | Kister | B23C 5/2221 |

FOREIGN PATENT DOCUMENTS

| | | |
|---|---|---|
| JP | 2011110634 A | 6/2011 |
| JP | 2011110635 A | 6/2011 |
| JP | 2017-504495 A | 2/2017 |
| WO | 2015117733 A1 | 8/2015 |
| WO | 2018/061227 A1 | 4/2018 |

\* cited by examiner

CUTTING INSERT

CROSS-REFERENCES TO RELATED APPLICATIONS

This application relates to and claims priority from Japanese Patent Application No. 2019-037336, filed on Mar. 1, 2019 and Japanese Patent Application No. 2019-215427, filed on Nov. 28, 2019, the entire disclosure of which are incorporated herein by reference.

BACKGROUND

Field

The present invention relates to a cutting insert used in a cutting tool with exchangeable cutting tips.

Description of Related Art

There conventionally is known a cutting insert that has a generally triangular outline shape in top view and in bottom view, as disclosed in WO 2018/061227, for example. The cutting insert disclosed in WO 2018/061227 is arranged so that the shape is the same even if the upper and lower faces are flipped, and the cutting edges can be replaced and used for a total of six times. Such a cutting insert is used in shoulder milling, for example, where orthogonal wall surfaces are machined, or the like, and is provided with a major cutting edge that primarily machines a wall surface, a wiper edge that machines a bottom face, and a corner edge that connects the major cutting edge and wiper edge. A cutting insert configured thus is referred to as a negative type, and has a flank clearance angle of 0°. Accordingly, the wedge angle is great and the level of strength of the cutting edge is high.

SUMMARY

Generally, the radial rake angle is set to a negative value when installing a negative-type cutting insert, to prevent the edge portion of the lower face from overlapping the rotational trajectory of the cutting edge when installed to the body. Installing the cutting insert in this way secures a large gap between the flank and rotational trajectory. However, in this case, the space above the rake face of the cutting insert is narrowed proportionately to the increase in space between the flank and rotational trajectory, and produced chips are discharged less readily.

When installing the cutting insert to the body with the top and bottom having been reversed so that this rake face is the face in contact with the body, the cutting insert may be attached to the body at a posture deviated from the initially intended posture if the rake face has been damaged due to abrasion by chips. If the posture of the cutting insert attached to the body changes, cutting performance, state of the machining surface, and so forth, also change in a corresponding manner. With the foregoing in view, it is an object of the present invention to provide a cutting insert where there is little damage to the rake face.

A cutting insert according to an aspect of the present invention includes a major cutting edge, a minor cutting edge, and a connecting cutting edge that connects the major cutting edge and the minor cutting edge, includes a first minor cutting edge flank of which a clearance angle of a flank corresponding to the minor cutting edge is 0°, and a second minor cutting edge flank that connects to the first minor cutting edge flank and that has a clearance angle of a negative value, and includes a first connecting cutting edge flank of which a clearance angle of a flank corresponding to the connecting cutting edge is 0° or greater, and a second connecting cutting edge flank that connects to the first connecting cutting edge flank and has a clearance angle that is greater than the clearance angle of the first connecting cutting edge flank.

According to this aspect, the first minor cutting edge flank that connects to the minor cutting edge is recessed further toward the center side of the cutting insert as compared to the second minor cutting edge flank. A sufficient gap can be secured between the first minor cutting edge flank and the rotational trajectory of the cutting edge even without setting the radial rake angle to a negative value. The radial rake angle can be set to around 0° as to the body, so a space known as a pocket where produced chips extend can be formed larger. Accordingly, a cutting insert can be provided where chips can be prevented from abrading and damaging the rake face of the cutting insert according to the present invention.

In the cutting insert according to the above aspect, the connecting cutting edge flank preferably further includes a third connecting cutting edge flank that connects to the second connecting cutting edge flank. Preferably, the clearance angle of the first connecting cutting edge flank is 0°, the clearance angle of the second connecting cutting edge flank is a positive value, and the clearance angle of the third connecting cutting edge flank is 0°. The minor cutting edge flank preferably further includes a third minor cutting edge flank that connects to the second minor cutting edge flank and that has a clearance angle of 0°.

According to this aspect, when the top and bottom of the cutting insert is reversed and cutting edges at the lower face are used, parts that had been functioning as the first, second and third connecting cutting edge flanks of the cutting edges at the upper face function as third, second, and first minor cutting edge flanks at the cutting edges at the lower face. In the same way, parts that had been functioning as the first, second and third minor cutting edge flanks of the cutting edges at the upper face function as third, second, and first connecting cutting edge flanks at the cutting edges at the lower face. Accordingly, the cutting insert can be reversed top and bottom and still be used in the same way as before reversing.

In the cutting insert according to the above aspect, the third minor cutting edge flank preferably is situated outward from the first minor cutting edge flank in top view, and the third connecting cutting edge flank preferably is situated inward from the first connecting cutting edge flank in top view.

According to this aspect, the third minor cutting edge flank protrudes outward (toward the outer circumferential side) as compared to the first minor cutting edge flank, so the third minor cutting edge flank of the minor cutting edge (lower portion of the wiper edge) is thick, and the minor cutting edge is not readily fractured. The first minor cutting edge flank (upper portion of the wiper edge) can be retracted inward (toward the center side) while maintaining strength of the minor cutting edge, thereby enabling a large gap to be secured between the first minor cutting edge flank and the rotational trajectory of the cutting edge.

In the cutting insert according to the above aspect, an angle a formed by the major cutting edge and the minor cutting edge preferably is $70° < a < 100°$.

According to this aspect, the cutting insert can be suitably used for shoulder milling.

According to the above aspect, the connecting cutting edge preferably curves outward in top view.

According to this aspect, the connecting cutting edge is not fractured as readily as a straight connecting cutting edge (corner edge) intersecting at an acute angle.

In the cutting insert according to the above aspect, the outline shape in top view and an outline shape in bottom view preferably are the same.

According to this aspect, the top and bottom can be reversed and the cutting edges at the lower face of the cutting insert can be used when the cutting edges at the upper face are worn or damaged.

In the cutting insert according to the above aspect, the upper face preferably has a general regular polygonal shape, and even more preferably, the connecting cutting edge of the upper face and the connecting cutting edge of the lower face do not overlap in top view.

According to this aspect, the minor cutting edge on the upper face side and the connecting cutting edge on the lower face side are at offset positions in top view, and accordingly even if the minor cutting edge at the upper face side is greatly damaged due to fracturing or the like, for example, the connecting cutting edge at the lower face side is not readily affected. In the same way, even if the connecting cutting edge at the upper face side is damaged, the minor cutting edge at the lower face side is not readily affected.

In the cutting insert according to the above aspect, the connecting cutting edge flank of the upper face preferably connects to the wiper edge of the lower face, and the wiper edge flank of the upper face preferably connects to the corner edge of the lower face.

According to this aspect, when the top and bottom of the cutting insert is reversed and cutting edges at the lower face are used, parts that had been functioning as the first, second and third connecting cutting edge flanks of the cutting edges at the upper face function as third, second, and first minor cutting edge flanks at the cutting edges at the lower face. In the same way, parts that had been functioning as the first, second and third minor cutting edge flanks of the cutting edges at the upper face function as third, second, and first connecting cutting edge flanks at the cutting edges at the lower face. Accordingly, the cutting insert can be reversed top and bottom and still be used in the same way as before reversing.

According to the present invention, a cutting insert can be provided where chips can be prevented from abrading and damaging the rake face of the cutting insert according to the present invention.

DETAILED DESCRIPTION

Figure 2:
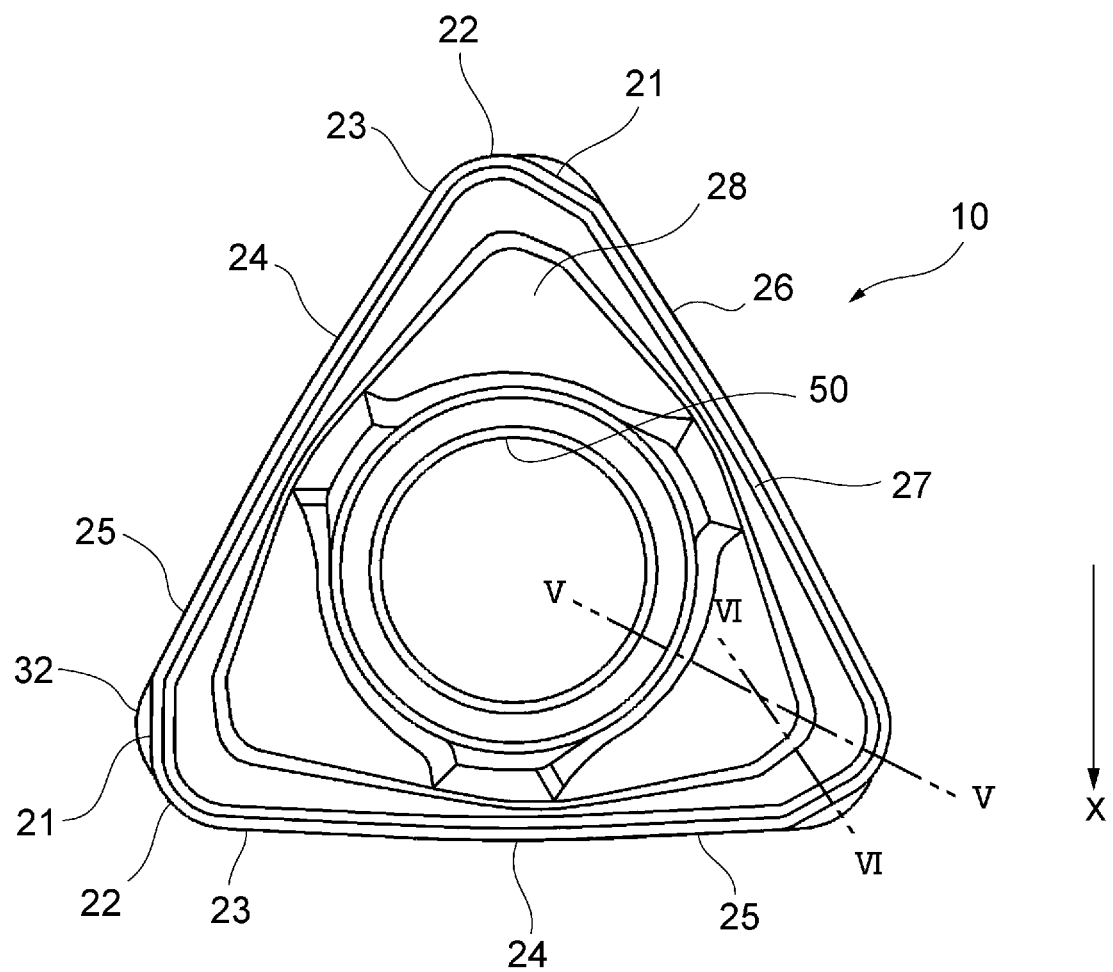
FIG. 2 is a plan diagram illustrating an upper face of the cutting insert illustrated in FIG. 1.
Figure 3:
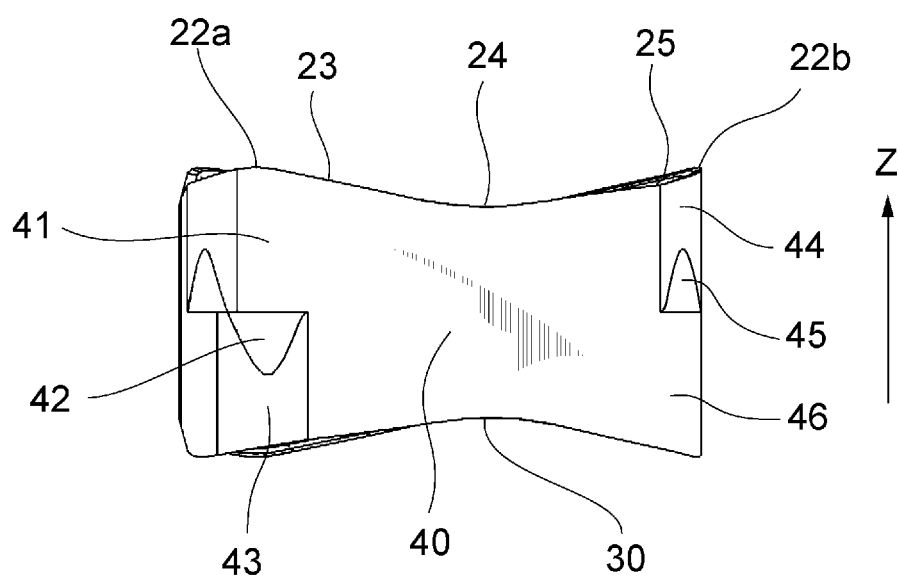
FIG. 3 is a side view, viewing the cutting insert illustrated in FIG. 1 from a direction facing a side face corresponding to a major cutting edge.

An embodiment of the present invention will be described below with reference to the Figures. Note that in the Figures, items denoted by the same reference symbols have the same or equivalent configurations. Two axes, an X axis and Z axis that are orthogonal to each other, are set such as illustrated in FIGS. 2 and 3, to facilitate description. Also, when describing the positional relation between two objects, a case where an object B is situated at a position further in the direction of the arrowhead side of the Z axis in relation to another object A may be described as "object B is above object A". Further, a case where the object B is situated at a position on the opposite side in the direction of the arrowhead side of the Z axis in relation to the other object A may be described as "object B is below object A".

Figure 1:
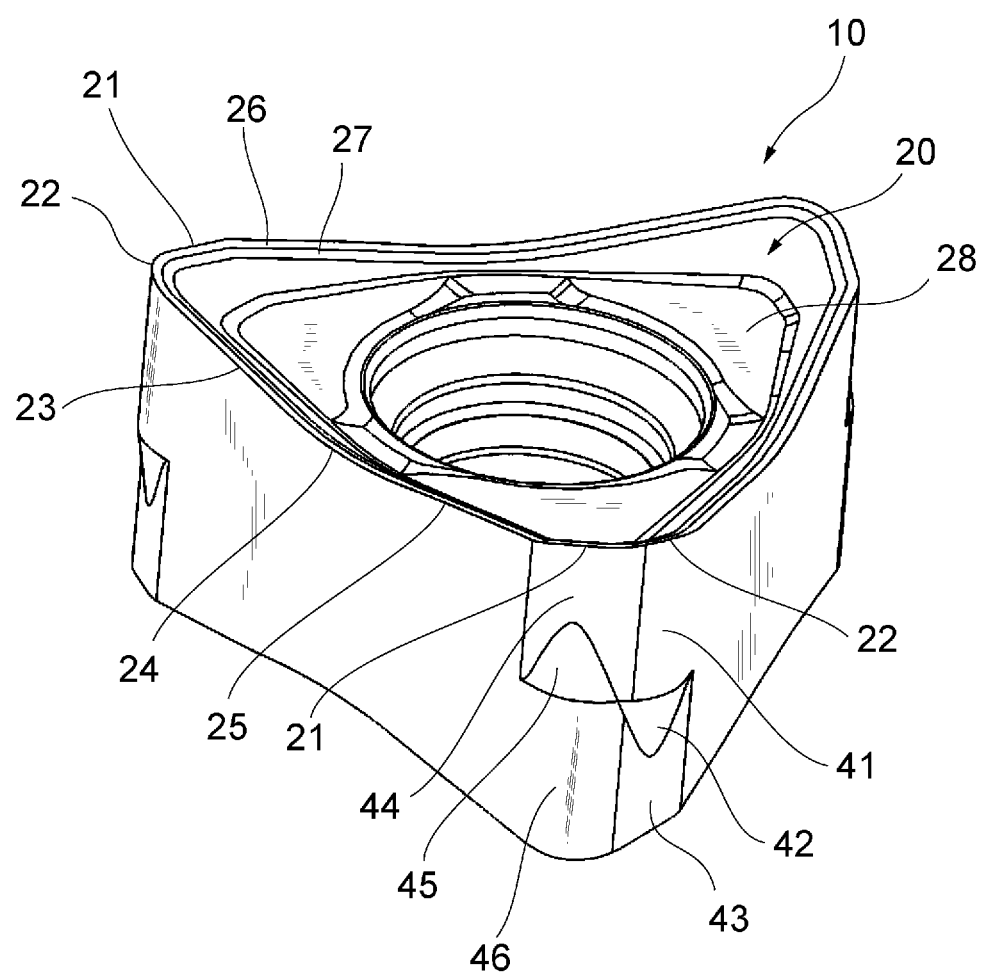
FIG. 1 is a perspective view illustrating a cutting insert according to an embodiment of the present invention.

FIG. 1 is a perspective view illustrating a cutting insert 10 according to an embodiment of the present invention. The cutting insert 10 according to the present embodiment is configured including an upper face 20, a lower face 30 on the opposite side from the upper face 20, and a side face 40 connecting between the upper face 20 and lower face 30, as illustrated in FIG. 1. A through hole 50 that passes through from the upper face 20 to the lower face 30 is formed. A fastener such as a screw or the like is inserted into the through hole 50, and the cutting insert 10 is fixed to a body 60, which is the main body portion of the cutting tool. The body 60 will be described in detail later with reference to FIGS. 7 and 8.

FIG. 2 is a plan diagram (top diagram) illustrating the upper face 20 of the cutting insert 10 illustrated in FIG. 1. In the following description, viewing the cutting insert 10 from the upper face 20 toward the lower face 30 may be referred to as a "top view" (plan view), and viewing the cutting insert 10 from the lower face 30 toward the upper face 20 may be referred to as a "bottom view" (underside view). The cutting insert 10 has the same shape when rotated 180° on the X axis shown in FIG. 2. In other words, the outline shape in top view and the outline shape in bottom view are the same. Accordingly, the configuration of the upper face 20 will be described in detail representatively, and repetitive description regarding the configuration of the lower face 30 will be omitted.

The upper face 20 has a 120° rotationally-symmetrical shape on a center axial line of the through hole 50, which corresponds to the center of the cutting insert 10, as illustrated in FIG. 2. A ridge line where the upper face 20 and side face 40 intersect will be referred to as "side ridge portion" of the upper face 20. In the same way, a ridge line where the lower face 30 and side face 40 illustrated in FIG. 1 intersect will be referred to as "side ridge portion" of the lower face 30. The side ridge portions of the upper face 20 and lower face 30 act as cutting edges that contribute to cutting.

In the example illustrated in FIGS. 1 and 2, a configuration is made where there are three sets of cutting edges connected, each set made up of a straight minor cutting edge 21 (hereinafter referred to as "wiper edge"), a connecting cutting edge 22 that connects to the wiper edge 21 and curves toward the outward direction of the cutting insert 10 (hereinafter referred to as "corner edge"), and major cutting edges 23, 24, and 25 connecting to the corner edge 22. Note that the wiper edge 21 is not restricted to being straight, and may have a gradual curving form.

In the example illustrated in FIGS. 1 and 2, each major cutting edge 23, 24, and 25 includes a first major cutting edge straight portion 23 which is straight and connects to the corner edge 22, a major cutting edge curved portion 24 that connects to the first major cutting edge straight portion 23 and which is curved with a relatively small curvature, and a second major cutting edge straight portion 25 which is straight and connects to the major cutting edge curved portion 24.

That is to say, the second major cutting edge straight portion 25 of a certain set A connects to the wiper edge 21 of another set B, and the wiper edge 21 of the certain set A further connects to the second major cutting edge straight portion 25 of yet another set C. The wiper edge 21 functions to reduce the surface coarseness of the machined surface of the work. The first major cutting edge straight portion 23, the major cutting edge curved portion 24, and the second major cutting edge straight portion 25 undertake a greater part of cutting as a so-called major cutting edge.

The angle formed between a line extending from the wiper edge 21 and a line extending from the first major cutting edge straight portion 23 is greater than 70° and smaller than 100°. In the example illustrated in FIG. 1, a line extending from the wiper edge 21 and a line extending from the first major cutting edge straight portion 23 intersect at an angle of 92°. The cutting insert 10 shaped thus is well-suited to shoulder milling. The upper face 20 has a land 26, a rake face 27, and an insert seat contact face 28 in the example illustrated in FIG. 1. The land 26 connects to each of the cutting edges 21, 22, 23, 24, and 25 and descends the farther away from these cutting edges. The rake face 27 connects to the land 26 and descends the farther away from the cutting edges, at an angle greater than that of the land 26.

The insert seat contact face 28 connects to the rake face 27, and comes into contact with a bottom face of an insert seat 61 formed on the body 60, which will be described later. The insert seat contact face 28 is a part serving as a reference for the angles of the parts of the cutting insert 10. In other words, the degrees of inclination of the parts such as the cutting edges and so forth are defined with the insert seat contact face 28, which is deemed to be a level surface, as a reference.

Figure 4:
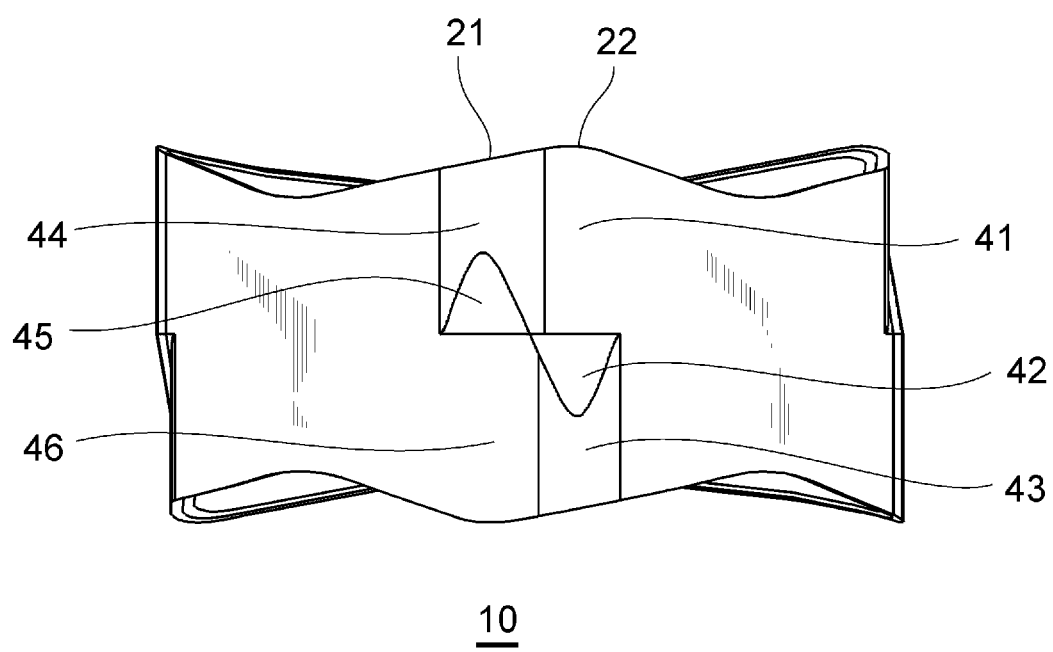
FIG. 4 is a side view, viewing the cutting insert illustrated in FIG. 1 from a direction facing a side face corresponding to a corner edge.

FIG. 3 is a side view, viewing the cutting insert 10 from a direction facing the side face 40 corresponding to the major cutting edges 23, 24, and 25. In further detail, FIG. 3 is a side view, viewing the cutting insert 10 from the front of the side face 40 connecting to the major cutting edge curved portion 24. In the same way, FIG. 4 is a side view, viewing the cutting insert 10 illustrated in FIG. 1 from a direction facing the side face 40 corresponding to the corner edge 22. It can be seen from FIGS. 3 and 4 that the cutting edges configured including the wiper edge 21, corner edge 22, major cutting edges 23, 24, and 25, and so forth, first descend from a certain corner edge 22a toward another adjacent corner edge 22b, and thereafter rise.

Figure 5:
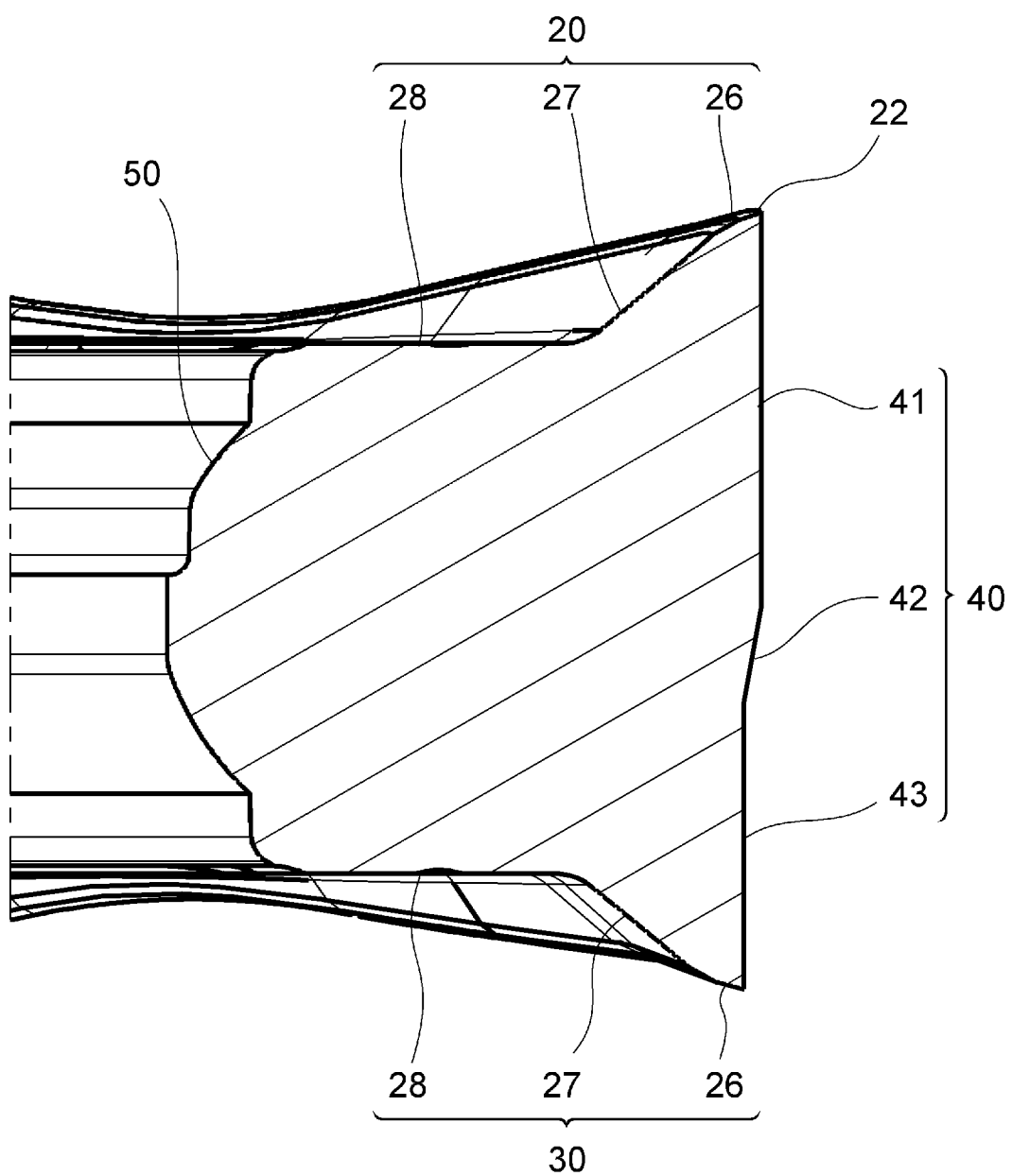
FIG. 5 is a cross-sectional view taken along line V-V in FIG. 2.

FIG. 5 is a cross-sectional view taken along line V-V in FIG. 2, and is a cross-sectional view taken at the middle of the corner edge 22, i.e., at a position corresponding to the middle point of the length of the corner edge 22. The side face 40 (so-called flank) corresponding to the corner edge 22 has a first corner edge flank (first connecting cutting edge flank) 41 that directly connects to the corner edge 22 and has a clearance angle of 0°, a second corner edge flank (second connecting cutting edge flank) 42 that connects to the first corner edge flank 41 and has a positive value for the clearance angle, and a third corner edge flank (third connecting cutting edge flank) 43 that connects to the second corner edge flank 42 and has a clearance angle of 0°, as illustrated in FIG. 5.

The flanks 41, 42, and 43 of the corner edge 22 configured thus are arranged such that the third corner edge flank 43 is situated inward from the first corner edge flank 41 in top view. In other words, the distance from the center axis of the through hole 50 is shorter for the third corner edge flank 43 as compared to the first corner edge flank 41.

Figure 6:
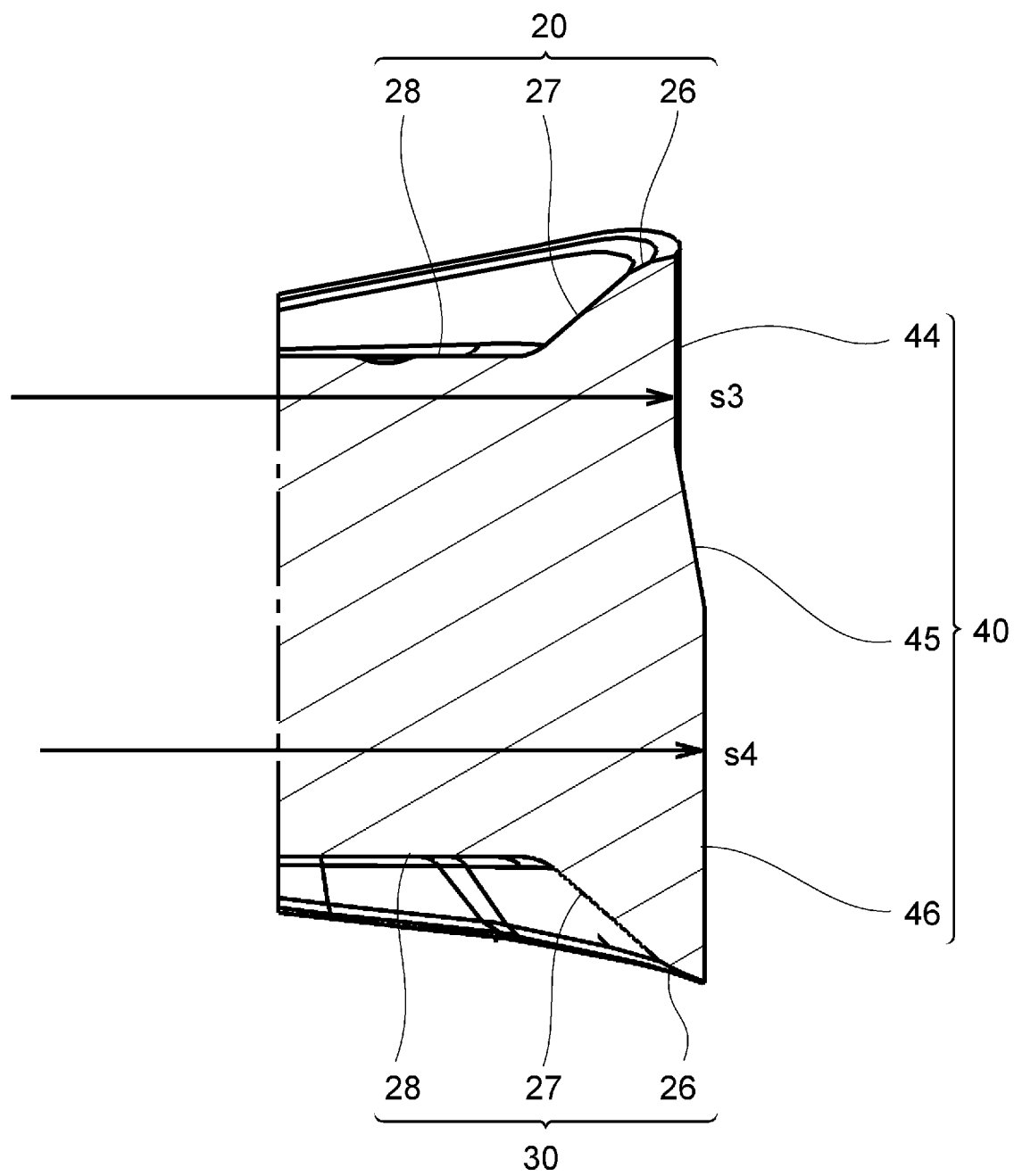
FIG. 6 is a cross-sectional view taken along line VI-VI in FIG. 2.

FIG. 6 is a cross-sectional view taken along line VI-VI in FIG. 2, and is a cross-sectional view taken at the middle of the wiper edge 21, i.e., at a position corresponding to the middle point of the length of the wiper edge 21. Flanks 44, 45, and 46 that are part of the side face 40 and correspond to the wiper edge 21 have a first wiper edge flank (first minor cutting edge flank) 44 that directly connects to the wiper edge 21 and has a clearance angle of 0°, a second wiper edge flank (second minor cutting edge flank) 45 that connects to the first wiper edge flank 44 and has a negative value for the clearance angle, and a third wiper edge flank (third minor cutting edge flank) 46 that connects to the second wiper edge flank 45 and has a clearance angle of 0°, as illustrated in FIG. 6.

The flanks of the wiper edge 21 configured thus are arranged such that the third wiper edge flank 46 is situated outward from the first wiper edge flank 44 in top view. In other words, the distance from the center axis of the through hole 50 is longer for the third wiper edge flank 46 as compared to the first wiper edge flank 44.

When reversing the top and bottom of the cutting insert 10 according to the present embodiment to use the cutting edges of the lower face 30, the third corner edge flank 43 becomes the first wiper edge flank 44 of the wiper edge 21 at the lower face 30. In the same way, when reversing the top and bottom to use the cutting edges of the lower face 30, the third wiper edge flank 46 becomes the first corner edge flank 41 of the lower face 30. Due to such a shape, the corner edge 22 of the upper face 20 and a corner edge 32 of the lower face 30 do not overlap in top view, and are at positions offset from each other in the circumferential direction on the center axis of the through hole 50.

Figure 7:
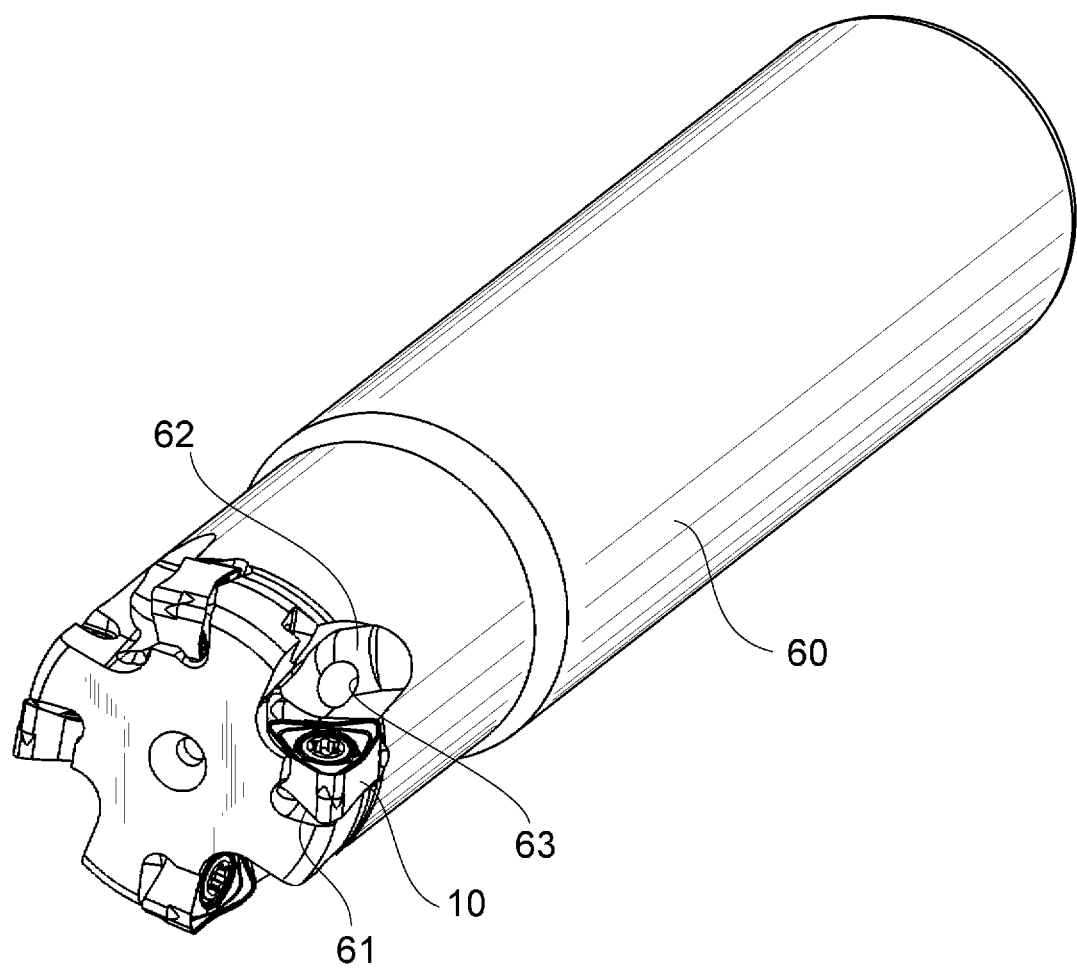
FIG. 7 is a perspective view illustrating a cutting tool that has been provided with the cutting insert illustrated in FIG. 1.
Figure 8:
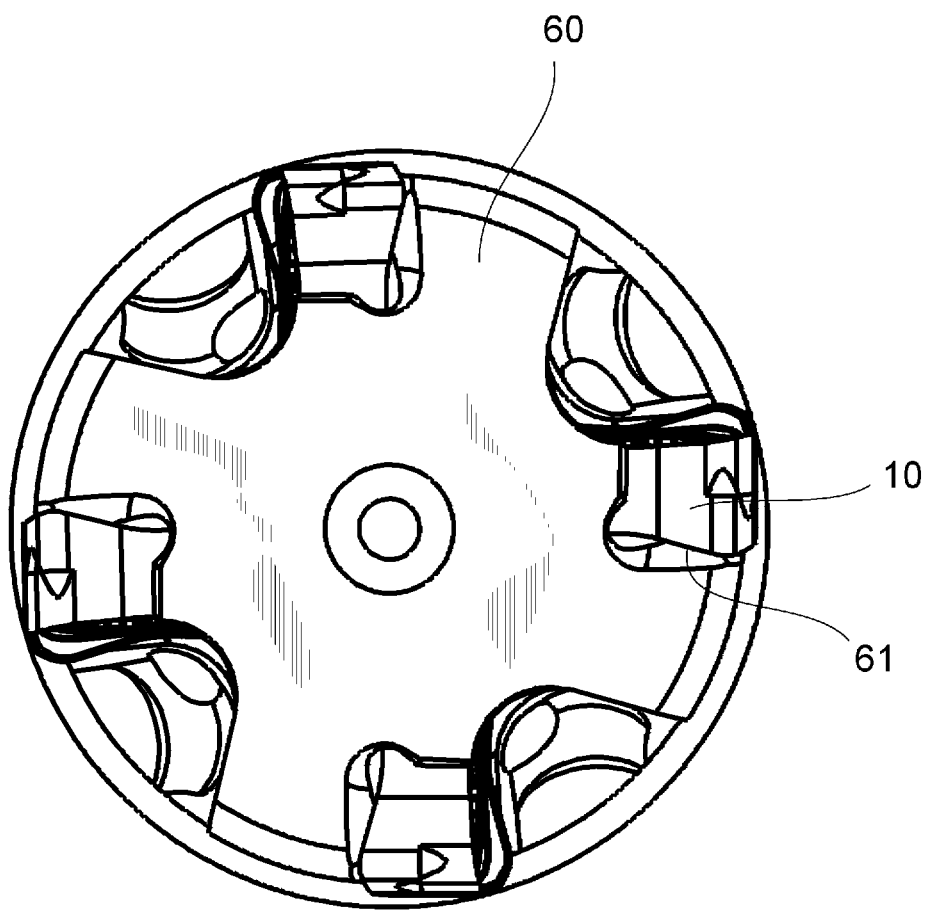
FIG. 8 is a frontal view illustrating the tip end of the cutting tool illustrated in FIG. 7.

Next, a state where the cutting insert 10 has been attached to the body will be described. FIG. 7 is a perspective view illustrating a cutting tool that has been provided with the cutting insert 10. FIG. 8 is a frontal view illustrating the tip end of the cutting tool. The cutting insert 10 is attached to the generally-cylindrical body 60 with the insert seat contact face 28 (see FIG. 5) of the lower face 30 abutting the body 60, as illustrated in FIGS. 7 and 8. The body 60 to which the cutting insert 10 has been attached is configured to be capable of cutting by rotating in the direction that the upper face 20 is facing.

The body 60 has four insert seats 61 for loading cutting inserts 10 at the tip end thereof, the four insert seats 61 having been formed equidistantly. The normal of the bottom face of each insert seat 61 is inclined as to the rotational axis of the body 60, and faces the machining surface of the work. Accordingly, when the cutting insert 10 is attached to the body 60, the cutting insert 10 appears to be tilted forward when viewed from a perpendicular direction as to the rotational axis of the body 60.

An open space 62 (hereinafter referred to as "pocket") is formed above the upper face 20. Chips being produced are curled into an appropriate size at the pocket 62. A spray port 63 that sprays air and/or coolant is formed in an inner wall of the pocket 62.

Figure 9A:
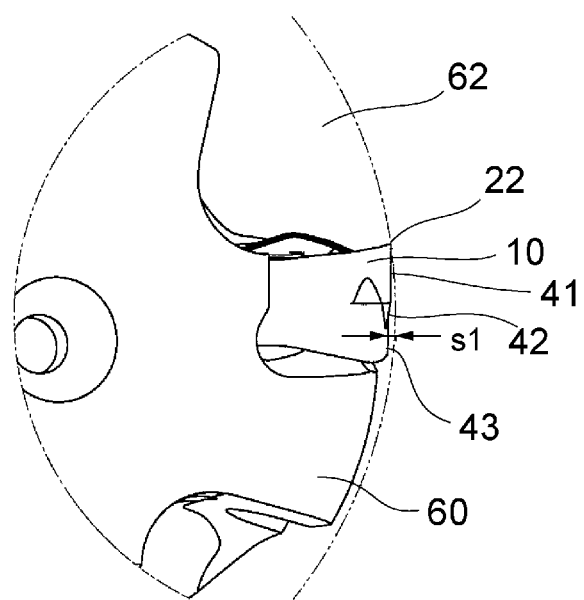
FIG. 9A is a Figure schematically illustrating a gap between the side face and rotational trajectory of a cutting tip of the cutting insert according to the embodiment, in a state of having been installed to a body.
Figure 9B:
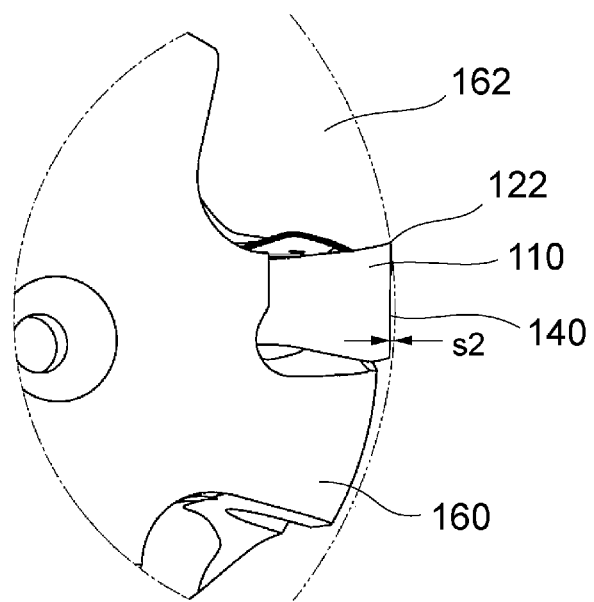
FIG. 9B is a Figure schematically illustrating a gap between a side face and rotational trajectory of a cutting tip of a conventional negative-type cutting insert, in a state of having been installed to a body.

Next, advantages of the above embodiment will be described. FIG. 9A is a Figure for describing the positional relation between the rotational trajectory and flanks 41, 42, and 43 corresponding to the corner edge 22 in the cutting insert 10 according to the present embodiment, schematically illustrating a gap s1 between the flanks 41, 42, and 43 and the rotational trajectory of the cutting tip of the corner edge 22 in the cutting insert 10, in a state of having been installed to the body 60. FIG. 9B is a Figure for describing the positional relation between the rotational trajectory and a flank corresponding to a corner edge in a common cutting insert that has a clearance angle of 0°, schematically illustrating a gap s2 between a flank (side face) 140 and rotational trajectory of a cutting tip of a corner edge 122 of a cutting insert 110, in a state of having been installed to a body 160.

The second corner edge flank 42 having a clearance angle of a positive value is formed on the cutting insert 10, so the size of the gap s1 created between the surface of the flank and the rotational trajectory is greater than the size of the gap s2 created between the surface of the flank and the rotational trajectory in a common cutting insert that has a clearance angle of 0°, which has been attached to the body 160 so as to assume the same posture, as illustrated in FIGS. 9A and 9B. There is no need to attach a cutting insert 10 to the body 60 with a radial rake angle having a great negative value in an attempt to secure a gap. A large pocket 62 can be secured, so produced chips can be prevented from abrading and damaging the upper face 20 of the cutting insert 10.

The upper and lower faces of the cutting insert 10 have a 120° rotationally-symmetrical shape, and further the cutting insert 10 has the same shape when rotated 180° on the X axis. Accordingly, the cutting edges can be replaced for a total of six times when worn or damaged.

The wiper edge 21 on the upper face side and the corner edge 32 on the lower face side are at offset positions in the cutting insert 10 in top view, and accordingly even if the wiper edge 21 at the upper face side is greatly damaged due to fracturing or the like, the corner edge 32 at the lower face side is not readily affected. In the same way, even if the corner edge 22 at the upper face side is damaged, the wiper edge at the lower face side is not readily affected.

The third corner edge flank 43 that connects to the second corner edge flank 42 having a positive clearance angle value is provided, and moreover the clearance angle of the third corner edge flank 43 is 0°. Accordingly, there is no need to secure a sufficiently great size for the gap s1 and excessively reduce the size of the lower face 30. Securing a large size for the lower face 30 also secures a large size for an insert seat contact face formed on the lower face 30, so the cutting insert 10 is fixed to the body 60 more solidly.

The presence of the second wiper edge flank 45 with a clearance angle of a negative value that connects to the first wiper edge flank 44 with a clearance angle of 0°, and the third wiper edge flank 46 with a clearance angle of 0° that connects thereto, make for a thicker lower portion of the wiper edge 21, so fracturing and so forth of the wiper edge 21 occurs less readily. That is to say, in a case where the first wiper edge flank 44 extends to the lower face 30, the length from the center of the cutting insert 10 (the above-described center axial line of the through hole 50) to the side face is constant at s3 (illustrated in FIG. 6), but the cutting insert 10 has the second wiper edge flank 45 and third wiper edge flank 46, so the length from the center of the cutting insert 10 to the side face 40 is s4 (illustrated in FIG. 6) that is longer than s3, near the lower face 30. Accordingly, the strength of the wiper edge 21 is greater.

Description has been made regarding the present invention by way of an embodiment as an example thereof, but the present invention is not restricted to the above embodiment. That is to say, various modifications of the present invention can be made without departing from the basic technical spirit of having a minor cutting edge, a connecting cutting edge that connects to the minor cutting edge, and a major cutting edge that connects to the connecting cutting edge; having a first minor cutting edge flank of which a clearance angle of a flank corresponding to the minor cutting edge is 0°, and a second minor cutting edge flank that connects to the first minor cutting edge flank and that has a clearance angle of a negative value; and having a first connecting cutting edge flank of which a clearance angle of a flank corresponding to the connecting cutting edge is 0° or greater, and a second connecting cutting edge flank that connects to the first connecting cutting edge flank and has a clearance angle that is greater than the clearance angle of the first connecting cutting edge flank.

Although description has been made in the above embodiment that the entire side ridge portion of the upper face 20 is a cutting edge, an embodiment may be made where only part of the side ridge portion is a cutting edge. In this case, the upper face 20 needs to have at least one minor cutting edge, a connecting cutting edge connecting to the minor cutting edge, and a major cutting edge connecting to the connecting cutting edge.

Also, although description has been made in the above embodiment that the connecting cutting edge (corner edge) 22 is a curved cutting edge, an embodiment may be made where the connecting cutting edge 22 is a straight cutting edge. It should be noted, however, that the connecting cutting edge 22 is fractured less readily if curved.

Also, although description has been made in the above embodiment that the clearance angle of the first corner edge flank 41 is 0°, an embodiment may be made having a clearance angle of a positive value. In this case, the clearance angle of the second corner edge flank 42 will have a clearance angle of an even greater positive value.

Also, although description has been made in the above embodiment that the major cutting edge curved portion 24 is situated between the first major cutting edge straight portion 23 and the second major cutting edge straight portion 25, an embodiment may be made where a straight cutting edge is provided instead of the major cutting edge curved portion 24. That is to say, the major cutting edge may be a straight cutting edge that connects between one corner edge and another corner edge.

Also, although description has been made in the above embodiment that a line extending from the wiper edge 21 and a line extending from the first major cutting edge straight portion 23 intersect at an angle of 92°, the cutting insert according to the present invention is not restricted to this value. It should be noted, however, that the cutting insert can be suitably used for shoulder milling if the intersecting angle a of these two lines is in a range of 70°<a<100°.

Also, although description has been made in the above embodiment that the clearance angle of the third corner edge flank 43 is 0° and the clearance angle of the third wiper edge flank 46 is 0°, and that the third corner edge flank 43 is situated inward from the first corner edge flank 41 in top view and similarly the third wiper edge flank 46 is situated outward from the first wiper edge flank 44 in top view, the third corner edge flank 43 and third wiper edge flank 46 are not restricted to this. That is to say, the clearance angles of the third corner edge flank 43 and third wiper edge flank 46 may be set as appropriate in accordance with mode of use. The third corner edge flank 43 may be situated outward from the first corner edge flank 41, and the third wiper edge flank 46 may also be situated inward from the first wiper edge flank 44.

Also, although description has been made in the above embodiment that the upper face 20 and lower face 30 have a generally triangular shape that is 120° rotationally symmetrical, an embodiment may be made where the shape is another generally polygonal shape, such as a generally quadrangular or generally hexagonal shape, for example.

Also, although description has been made in the above embodiment that the third corner edge flank 43 of the upper face 20 is the first wiper edge flank 44 of the wiper edge of the lower face 30, and the third wiper edge flank 46 of the upper face 20 is the first corner edge flank 41 of the lower face 30, an embodiment may be made where the positions of the corner edges and wiper edges are not offset between the upper and lower faces.

Also, although description has been made in the above embodiment regarding the cross-sectional shape at the middle of the corner edge 22, the position where the first corner edge flank and the second corner edge flank are provided may be a position other than the middle of the corner edge 22, and the entirety of the corner edge 22 may be provided with these two. In the same way, the position where the first wiper edge flank and the second wiper edge flank are formed may be any position of the wiper edge 21 or the entirety thereof.

What is claimed is:
1. A cutting insert, comprising:
   an upper face;
   a lower face; and
   a side face connecting the upper face and the lower face;
   wherein a cutting edge is formed on at least part of an intersecting ridge line portion of the upper face and the side face,
   wherein the cutting edge includes
      a major cutting edge,
      a minor cutting edge, and
      a connecting cutting edge that connects the major cutting edge and the minor cutting edge,
   wherein a minor cutting edge flank that is part of the side face and that corresponds to the minor cutting edge includes
      a first minor cutting edge flank that connects to the minor cutting edge and that has a clearance angle of 0°, and
      a second minor cutting edge flank that connects to the first minor cutting edge flank and that has a clearance angle of a negative value,
   wherein a connecting cutting edge flank that is part of the side face and that corresponds to the connecting cutting edge includes
      a first connecting cutting edge flank that connects to the connecting cutting edge and that has a clearance angle of 0° or greater, and
      a second connecting cutting edge flank that connects to the first connecting cutting edge flank and has a clearance angle that is greater than the clearance angle of the first connecting cutting edge flank;
   wherein the connecting cutting edge flank further includes a third connecting cutting edge flank that connects to the second connecting cutting edge flank,
   wherein the clearance angle of the first connecting cutting edge flank is 0°, the clearance angle of the second connecting cutting edge flank is a positive value, and the clearance angle of the third connecting cutting edge flank is 0°,
   wherein the minor cutting edge flank further includes a third minor cutting edge flank that connects to the second minor cutting edge flank and that has a clearance angle of 0°, and
   wherein, in top view, the third minor cutting edge flank is situated outward from the first minor cutting edge flank, and the third connecting cutting edge flank is situated inward from the first connecting cutting edge flank.

2. The cutting insert according to claim 1,
wherein an angle a formed by the major cutting edge and the minor cutting edge is 70°<a<100°.

3. The cutting insert according to claim 2,
wherein the connecting cutting edge curves outward in top view.

4. The cutting insert according to claim 2,
wherein a cutting edge of the lower face is formed on at least part of an intersecting ridge line portion of the lower face and the side face,
wherein the cutting edge of the lower face includes a major cutting edge of the lower face, a minor cutting edge of the lower face, and a connecting cutting edge of the lower face that connects the major cutting edge of the lower face and the minor cutting edge of the lower face, and
wherein the connecting cutting edge flank of the upper face connects to the minor cutting edge of the lower face, and the minor cutting edge flank of the upper face connects to the connecting cutting edge of the lower face.

5. The cutting insert according to claim 1,
wherein the connecting cutting edge curves outward in top view.

6. The cutting insert according to claim 5,
wherein a cutting edge of the lower face is formed on at least part of an intersecting ridge line portion of the lower face and the side face,
wherein the cutting edge of the lower face includes a major cutting edge of the lower face, a minor cutting edge of the lower face, and a connecting cutting edge of the lower face that connects the major cutting edge of the lower face and the minor cutting edge of the lower face, and
wherein the connecting cutting edge flank of the upper face connects to the minor cutting edge of the lower face, and the minor cutting edge flank of the upper face connects to the connecting cutting edge of the lower face.

7. The cutting insert according to claim 1,
wherein an outline shape in top view and an outline shape in bottom view are the same.

8. The cutting insert according to claim 7,
wherein a cutting edge of the lower face is formed on at least part of an intersecting ridge line portion of the lower face and the side face,
wherein the cutting edge of the lower face includes a major cutting edge of the lower face, a minor cutting edge of the lower face, and a connecting cutting edge of the lower face that connects the major cutting edge of the lower face and the minor cutting edge of the lower face, and
wherein the connecting cutting edge of the upper face and the connecting cutting edge of the lower face do not overlap in top view.

9. The cutting insert according to claim 7,
wherein a cutting edge of the lower face is formed on at least part of an intersecting ridge line portion of the lower face and the side face,
wherein the cutting edge of the lower face includes a major cutting edge of the lower face, a minor cutting edge of the lower face, and a connecting cutting edge of the lower face that connects the major cutting edge of the lower face and the minor cutting edge of the lower face, and
wherein the connecting cutting edge flank of the upper face connects to the minor cutting edge of the lower face, and the minor cutting edge flank of the upper face connects to the connecting cutting edge of the lower face.

10. The cutting insert according to claim 1,
wherein the upper face has a polygonal shape.

11. The cutting insert according to claim 1,
wherein a cutting edge of the lower face is formed on at least part of an intersecting ridge line portion of the lower face and the side face,
wherein the cutting edge of the lower face includes a major cutting edge of the lower face, a minor cutting edge of the lower face, and a connecting cutting edge of the lower face that connects the major cutting edge of the lower face and the minor cutting edge of the lower face, and
wherein the connecting cutting edge flank of the upper face connects to the minor cutting edge of the lower face, and the minor cutting edge flank of the upper face connects to the connecting cutting edge of the lower face.

* * * * *